United States Patent
Cooper et al.

(10) Patent No.: US 7,451,488 B2
(45) Date of Patent: Nov. 11, 2008

(54) POLICY-BASED VULNERABILITY ASSESSMENT

(75) Inventors: Geoffrey Cooper, Palo Alto, CA (US); Luis Filipe Pereira Valente, Palo Alto, CA (US); Derek P. Pearcy, Mountain View, CA (US); Harry Alexander Richardson, London (GB)

(73) Assignee: Securify, Inc., Mountain View, CA (US)

( * ) Notice: Subject to any disclaimer, the term of this patent is extended or adjusted under 35 U.S.C. 154(b) by 840 days.

(21) Appl. No.: 10/835,687

(22) Filed: Apr. 29, 2004

(65) Prior Publication Data
US 2005/0010821 A1 Jan. 13, 2005

Related U.S. Application Data

(60) Provisional application No. 60/466,680, filed on Apr. 29, 2003.

(51) Int. Cl.
*G06F 12/14* (2006.01)
(52) U.S. Cl. ............................................. 726/25; 726/2
(58) Field of Classification Search ................ 726/25
See application file for complete search history.

(56) References Cited

U.S. PATENT DOCUMENTS

| | | | | |
|---|---|---|---|---|
| 6,546,493 | B1 * | 4/2003 | Magdych et al. | 726/25 |
| 7,228,566 | B2 * | 6/2007 | Caceres et al. | 726/25 |
| 2001/0014150 | A1 * | 8/2001 | Beebe et al. | 379/189 |
| 2003/0212779 | A1 * | 11/2003 | Boyter et al. | 709/223 |
| 2003/0212909 | A1 * | 11/2003 | Chandrashekhar et al. | 713/201 |
| 2004/0019803 | A1 * | 1/2004 | Jahn | 713/201 |
| 2005/0005169 | A1 * | 1/2005 | Kelekar | 713/201 |
| 2005/0015622 | A1 * | 1/2005 | Williams et al. | 713/201 |

* cited by examiner

*Primary Examiner*—Matthew B Smithers
(74) *Attorney, Agent, or Firm*—Michael A. Glenn; Glenn Patent Group

(57) ABSTRACT

A system and method for a vulnerability assessment mechanism that serves to actively scan for vulnerabilities on a continuous basis and interpret the resulting traffic in context of policy is provided. Vulnerability information is presented within an enterprise manager system enabling the user to access vulnerability information, recommended remediation procedures, and associated network traffic. A studio mechanism is used to add scanners to the appropriate policies and control the scope and distribution of scans within the target network.

33 Claims, 8 Drawing Sheets

| | | Vulnerability Name | Service | Port | State | Count | Component | Scanner Target | CVE IAVA | Days Old | Last Seen |
|---|---|---|---|---|---|---|---|---|---|---|---|
| 1 | View | OpenSSH < 3.7.1 | Ssh | 22 | Persistent | 2 | Severe | Alamo | CAN-2003-0682 | 1 | 03/11/04 12:46PM PST |
| 2 | View | format string attack against statd | Udp | 32768 | Persistent | 2 | Severe | Alamo | CVE-2000-0666 | 1 | 03/11/04 12:46PM PST |
| 3 | View | Apache < 2.0.43 | Tcp | 4578 | Persistent | 2 | Important | Alamo | CAN-2002-1156 | 1 | 03/11/04 12:46PM PST |
| 4 | View | Apache < 2.0.45 | Tcp | 4578 | Persistent | 2 | Important | Alamo | CAN-2003-0132 | 1 | 03/11/04 12:46PM PST |
| 5 | View | Apache < 2.0.46 | Tcp | 4578 | Persistent | 2 | Important | Alamo | CAN-2003-0245 | 1 | 03/11/04 12:46PM PST |
| 6 | View | Apache < 2.0.47 | Tcp | 4578 | Persistent | 2 | Important | Alamo | CAN-2003-0192 | 1 | 03/11/04 12:46PM PST |
| 7 | View | Apache < 2.0.48 | Tcp | 4578 | Persistent | 2 | Important | Alamo | CVE-2002-0061 | 1 | 03/11/04 12:46PM PST |
| 8 | View | Apache2 double slash dir index | Tcp | 4578 | Persistent | 2 | Important | Alamo | | 1 | 03/11/04 12:46PM PST |
| 9 | View | OpenSSH Reverse DNS Lookup bypass | Ssh | 22 | Persistent | 2 | Important | Alamo | CAN-2003-0386 | 1 | 03/11/04 12:46PM PST |
| 10 | View | Portable OpenSSH PAM timing attack | Ssh | 22 | Persistent | 2 | Important | Alamo | CAN-2003-0190 | 1 | 03/11/04 12:46PM PST |
| 11 | View | Remote host replies to SYN+FIN | Tcp | 0 | Persistent | 2 | Important | Alamo | | 1 | 03/11/04 12:46PM PST |
| 12 | View | SSH protocol version 1 enabled | Ssh | 22 | Persistent | 2 | Important | Alamo | | 1 | 03/11/04 12:46PM PST |
| 13 | View | Unconfigured web server | Tcp | 4578 | Persistent | 2 | Important | Alamo | | 1 | 03/11/04 12:46PM PST |
| 14 | View | fam service | Tcp | 32769 | Persistent | 2 | Important | Alamo | CVE-1999-0059 | 1 | 03/11/04 12:46PM PST |
| 15 | View | http TRACE XSS attack | Tcp | 4578 | Persistent | 2 | Important | Alamo | | 1 | 03/11/04 12:46PM PST |
| 16 | View | icmp timestamp request | Icmp | 0 | Persistent | 2 | Important | Alamo | CAN-1999-0524 | 1 | 03/11/04 12:46PM PST |
| 17 | View | statd service | Udp | 32768 | Persistent | 2 | Important | Alamo | CVE-1999-0018 | 1 | 03/11/04 12:46PM PST |
| 18 | View | Directory Scanner | Tcp | 4578 | Persistent | 2 | Informational | Alamo | | 1 | 03/11/04 12:46PM PST |
| 19 | View | HMAP | Tcp | 4578 | Persistent | 2 | Informational | Alamo | | 1 | 03/11/04 12:46PM PST |

Figure 7

| Reporting Element | Severe | Important | Informational | Resolved | Unreachable |
|---|---|---|---|---|---|
| 1. Alamo | 4 (0 new) | 30 (0 new) | 24 (0 new) | 0 | 0 |
| 2. Palo Alto (win2k) | 3 (0 new) | 9 (0 new) | 8 (0 new) | 2 | 0 |
| 3. Maginot | 2 (0 new) | 15 (0 new) | 12 (0 new) | 0 | 0 |

600

© Copyright 2000-2004 Securify, Inc. All Rights Reserved.   Terms of Use

POLICY-BASED VULNERABILITY ASSESSMENT

CROSS-REFERENCE TO RELATED APPLICATIONS

This application claims priority to U.S. Provisional Patent Application Ser. No. 60/466,680, filed Apr. 29, 2003, which application is incorporated herein in its entirety by the reference thereto. This application is related to the PCT Patent Application No. PCT/US01/19063 filed on Jun. 14, 2001, which claims priority to patent applications U.S. Provisional Patent Application Ser. No. 60/212,126 filed Jun. 16, 2000 and U.S. patent application Ser. No. 09/826,602 filed Apr. 5, 2001, the entire contents of which are hereby incorporated by reference.

BACKGROUND OF THE INVENTION

1. Technical Field

The invention relates generally to the field of network security management. More particularly, the invention relates to scanning for vulnerabilities on a continuous basis and interpreting the resulting traffic in the context of policy.

2. Description of the Prior Art

Networked information systems are an essential part of many organizations. Critical systems, services, and information resources all require protection that depends on effective orchestration of a variety of factors: network architecture, security products, site security, administrative procedures, end user responsibility, and more. A network security policy is an explicit plan of how to accomplish this multi-faceted protection, what objectives the plans should meet, and what assets are being protected.

U.S. patent application Ser. No. 09/479,781 filed Jan. 7, 2000, "A Declarative Language for Specifying a Security Policy" describes a system and method for defining network security policy in a formal way, the entire contents of which are hereby incorporated by reference. Also, U.S. patent application Ser. No. 09/881,147 filed Jun. 14, 2001, "System and Method for Security Policy" describes a system and method for monitoring network traffic using such formal description of network security policy, the entire contents of which are hereby incorporated by reference. Network monitoring for network security policy provides great visibility into the actual communications of machines on the network.

Because network monitoring technology is based on actual network traffic, it cannot provide information about how machines might communicate in the future based on their current configurations. Vulnerability scanning technology helps to fill this gap.

Vulnerability Scanning Technology

Vulnerability scanning technology is exemplified by commercial products such as the various scanners by Internet Security Systems, Inc. (ISS), the Cisco Scanner by Cisco Systems, Inc., and the Nessus Network Security Scanner. This technology examines the network configuration of hosts on the network by "probing" or "scanning" them using network traffic that is crafted to elicit a response. The response is interpreted and used to determine the configuration of the host that is scanned. Using various probing techniques, the technology is capable of:

scanning a range of Internet addresses to determine which addresses likely represent working hosts and which do not;

scanning a range of Transmission Control Protocol (TCP) and User Datagram Protocol (UDP) port numbers within a given host to determine which applications are likely active on a given working host; and probing an application on a given host to determine whether it is susceptible to previously known attacks, known as "vulnerabilities."

Weaknesses of Vulnerability Scanning Technology

A prominent weakness of vulnerability scanning technology is the sheer volume of information that it returns. Since the technology effectively maps all hosts, services, and vulnerabilities on the network, the resulting list contains many items that are already known to the network maintenance staff. The time spent removing known items from a vulnerability scanner report significantly reduces its effectiveness.

Typically, a vulnerability scanning tool is deployed on a regular basis. It is desirable to run this tool continuously, but the volume of data returned makes it difficult to do so and process the results effectively.

Another problem with current continuous vulnerability scanning technology is that its operation simulates that of an attacker. A network monitoring technology, which is simultaneously monitoring the network is likely to detect a vulnerability scanner as an attacker and alert network maintenance staff that a strong and persistent attack is in progress. Event though the network maintenance staff presumably knows that they are currently running a vulnerability scanner, the large number of monitoring violations presented by the monitor may make it difficult to find true monitoring results.

It would be advantageous for a network security policy to know what a scanner is doing such that the policy can monitor the network without causing the scanner events to look like an attack on the network.

Because a vulnerability scanner produces large amounts of information about the network, much of which is redundant, it would be advantageous to provide a mechanism to automatically remove such redundant information. It would also be advantageous to overcome the difficult task of turning such output of the vulnerability scanner into a workflow that helps remediate identified problems with the network.

SUMMARY OF THE INVENTION

A system and method for a vulnerability assessment mechanism that serves to actively scan for vulnerabilities on a continuous basis and interpret the resulting traffic in context of policy is provided. Vulnerability information is presented within an enterprise manager system enabling the user to access vulnerability information, recommended remediation procedures, and associated network traffic. A studio mechanism is used to add scanners to the appropriate policies and control the scope and distribution of scans within the target network.

The network security policy information is merged with the output of the vulnerability scanner. Using the network security policy's information, the output of the scanner is filtered, so that redundant information is removed about applications that are sanctioned by policy. This reduction of information reduces the information overload associated with vulnerability scanning technology, especially when continuous scanning is undertaken.

In addition, the policy monitoring system is provided, through said network security policy, with a description of the intended action of the vulnerability scanner. This permits the monitoring system to report the scanner's operation as a normal usage pattern of the network, eliminating the confusion that can result when a vulnerability scan is monitored.

These enhancements make it possible to run the vulnerability scanner in a continuous scanning mode, with both acceptable monitoring and vulnerability scanner results.

The vulnerability assessment system presents current vulnerability state of the infrastructure. When continuous scanning is used, the vulnerability assessment system provides changes to this state based on new vulnerabilities found or existing vulnerabilities removed. Throughout the process the policy adds context in terms specific to the customer applications allowing prioritized action to be taken to remediate problems. The policy further allows fine grain control of which network hosts are scanned, thus adapting easily to customer operating procedures for how scans may be carried out.

One embodiment of the invention provides a system architecture permitting the vulnerability assessment system to run on a policy-based monitor system, such as SecurVantage™ Monitor, under the management of a enterprise system, such as SecurVantage™ Enterprise. Policy compliance data generated by scanning traffic is correlated and presented within the context of the overall system policy. Each scanner is also accessible to review specific vulnerability information.

In one embodiment of the invention the vulnerability assessment system works in conjunction with other systems. An exemplary example of such systems is the SecurVantage™ product line. Customer specific policies are developed within a studio module. The policy-based monitor system captures network traffic and evaluates such traffic for network conformance. The policy-based monitor system provides a platform for the active scanning engine, which in one embodiment of the invention, is based on Nessus. Detailed data from the monitors is aggregated and presented in a real-time view within the enterprise system. The enterprise reporting system performs further data consolidation and maintains a long-term, continuous record of overall network security operation. The report engine accesses the data providing the appropriate daily, weekly, and monthly reports.

BRIEF DESCRIPTION OF THE DRAWINGS

FIG. 6 is an example view of a Web page from the policy-based monitor system user interface according to the invention;

FIG. 7 is an example view of a Web page from the policy-based monitor system user interface according to the invention.

DETAILED DESCRIPTION OF THE INVENTION

Figure 1:
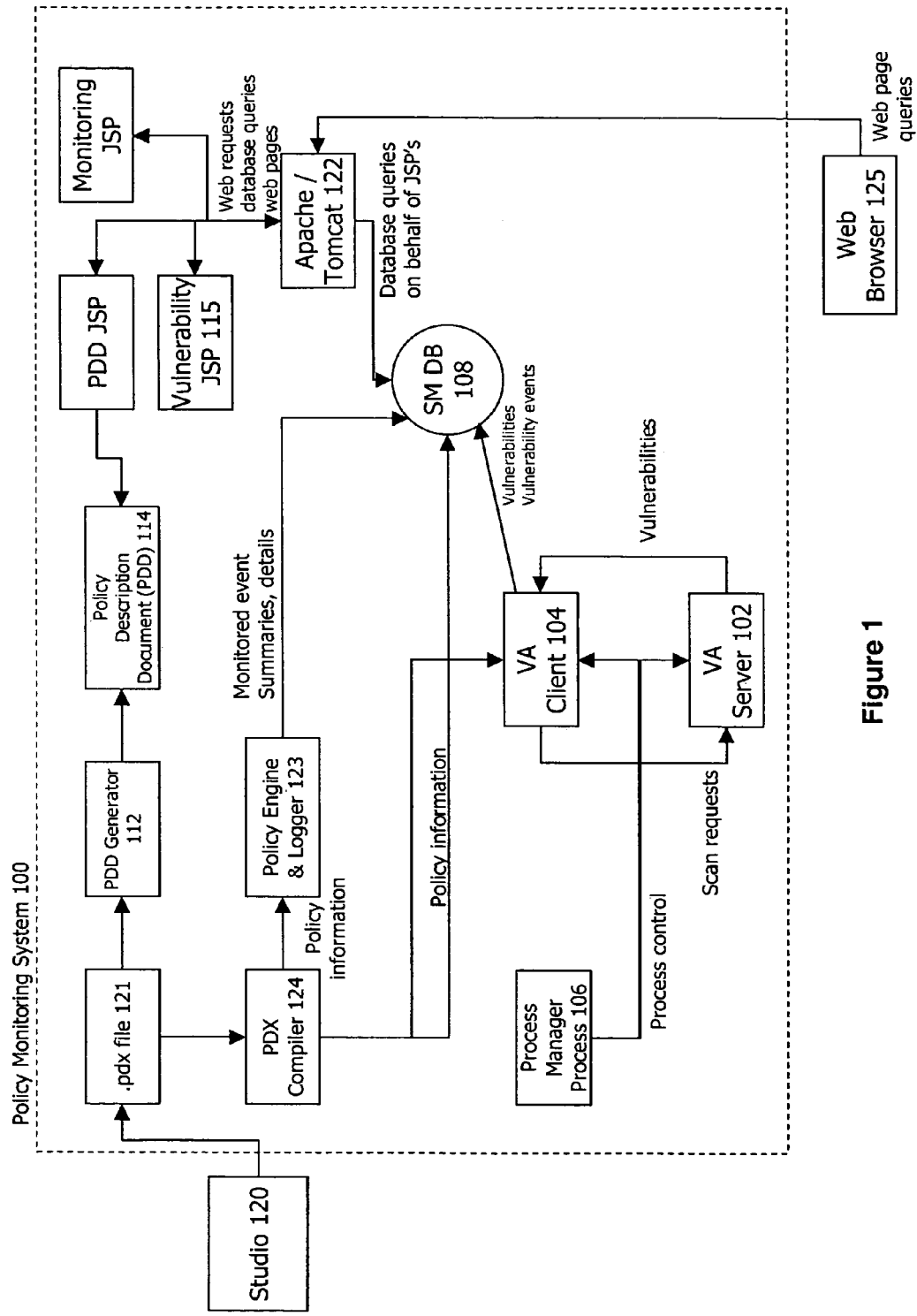
FIG. 1 is a schematic block diagram showing the relationship between the various components within a policy-based monitor system according to the invention.

A system and method for a vulnerability assessment mechanism that serves to actively scan for vulnerabilities on a continuous basis and interpret the resulting traffic in context of policy is provided. Vulnerability information is presented within an enterprise manager system enabling the user to access vulnerability information, recommended remediation procedures, and associated network traffic. A studio mechanism is used to add scanners to the appropriate policies and control the scope and distribution of scans within the target network.

Overview

One embodiment of the invention adds vulnerability scanning capabilities to a policy-based monitor system and method to detect network services which contravene policy and to detect application-level vulnerabilities, e.g. a host running a vulnerable version of an open source http server, such as Apache. Additionally, the invention provides policy-based vulnerability scanning to minimize false positives.

In one embodiment of the invention, vulnerability assessment (VA) scanners are represented in policy by network objects distinct from regular hosts. Each such scanner object presents a tree-view of the network objects in the policy, with checkboxes indicating which network objects are to be scanned. For each scanner, the studio module automatically generates scanning relationships for all scanned hosts. There are three possible outcomes: Service offered to scanner; Service offered to other hosts; and Service not offered. The studio module provides default policy outcomes, also referred to as dispositions, which can be changed by the user. A scanner object's properties window has a panel displaying scanning relationships for all network objects it scans. A network object's properties window has a panel displaying scanning relationships to all of its scanners.

An exemplary scanner is the Nessus Security Scanner. However, it should be appreciated that other security scanners can be used. According to one embodiment of the invention, the scanner scans hosts as per a given policy. The scanner does not report on open ports. Instead, the policy-based monitor system performs such functionality, based on information in the same policy that controls the scanner. The scanner reports all application-level vulnerabilities as vulnerability events. Scans may be scheduled by the user.

In one embodiment of the invention, vulnerability events are reported for new vulnerabilities, removed vulnerabilities and offline hosts. Vulnerability events are sent to and stored on the policy-based monitor system database and a vulnerability assessment database. Events are added to the policy-based monitor system database which reflect differences in vulnerability status, e.g. new vulnerabilities and removed vulnerabilities. The vulnerability assessment database contains all known vulnerabilities on the network. In one embodiment of the invention, Nessus output levels are mapped into policy outcome components. Event details give detailed description of vulnerability.

One embodiment of the invention provides a policy-based monitor system user interface that can be used to configure scheduling, bandwidth limit, etc. In one embodiment of the invention, the policy-based monitor system user interface manages updates of Nessus plugins, e.g. vulnerability definitions. A live data page includes a special row(s) for reporting on vulnerability scanners. Such page allows access to all vulnerability events within the reporting timeframe, irrespective of volume.

In one embodiment of the invention, a report is generated by the policy-based scanner that associates network objects in the active policy with vulnerabilities discovered on such network objects.

In another embodiment of the invention, a report is generated by a Java Server Page program (JSP) that queries the vulnerability assessment database, where the resulting report is sorted by host IP and where each vulnerability includes a web link to the complete vulnerability details. Such report is viewable through the policy-based monitor system web user interface and where the vulnerability pages are generated dynamically.

An Exemplary Policy-Based Vulnerability Assesment System

Following is a description of a functional interface and design of the vulnerability assessment (VA) subsystem integrated into a policy-based compliance enterprise manager system, such as Securify's SecurVantage™, according to one embodiment of the invention. Vulnerability assessment is used to identify host-level services not sanctioned by policy and application-level vulnerabilities in sanctioned services. Thus, it significantly increases visibility into a network's configuration by going well beyond what can be discerned from observed traffic.

In one embodiment of the invention, the VA component takes full advantage of a defined network security policy to determine which hosts to scan, which services are sanctioned by policy. The VA component also uses such network security policy to label the hosts with reported vulnerabilities according to the organizational structure, so that the identity and relevance of a host to the critical function of the network is more evident.

The VA subsystem is described with reference to FIG. 1, a schematic block diagram showing the relationship between the various components of the invention within a policy-based monitor system 100, such as SecurVantage™ Monitor, and includes the following features:

A vulnerability assessment server 102;
A vulnerability assessment client 104;
A mechanism for managing autonomous VA components, i.e. client and server processes, which can be fully integrated into a policy-based monitor system 100 such as Securify's SecurVantage™ Monitor Management System. Such mechanism is referred to herein as a process manager process (PMP) 106;
A mechanism for configuring scans, such as a studio module 120, where such mechanism can be fully integrated into a studio module, for example Securify's SecurVantage™ Studio;
A mechanism for reporting and viewing vulnerabilities, such as a vulnerability JSP 115, where such mechanism can be fully integrated into a policy-based monitor system 100.
A mechanism, e.g. incorporated into VA Client 104, for updating a repository of known vulnerabilities 108, where such mechanism can be fully integrated into a policy-based monitor system 100, such as Securify's SecurVantage™ Monitor System.
A mechanism for translating the policy description into a low level description that is: easy for the VA client and policy monitor to use; and contains a list of all the IP addresses to be scanned. Such mechanism is referred to herein as the pdxcompiler 124.

In some embodiments of the invention, the pdxcompiler 124 is configured with a list of IP addresses that are not to be scanned. Its compilation process is adjusted so that these addresses are removed from the list of IP addresses implied by the policy. This mechanism is useful because, among other reasons, it prevents a mistake in policy editing from causing a critical asset to be scanned inadvertently.

Example Workflow Algorithm

Referring to FIG. 1, a new network security policy is created using Studio 120 that contains instructions for the scanner that, in this example, is co-resident on monitor 100. The new network security policy is saved on the monitor 100 as a .pdx file 121. The PDD generator 112 is invoked automatically to update the PDD web pages 114 that are displayed via the Apache/Tomcat server 122. The .pdx policy is also distributed to the policy engine 123 and the VA client 104 via the pdx compiler 124. Continuous scanning and monitoring of the network now commences or continues based on the new .pdx policy file 121. The VA Client 104 instructs the VA server 102 to scan network hosts based on the specification for this scanner contained within the .pdx file 121, as follows:

Vulnerabilities in policy-sanctioned applications are detected at the VA server 102. They are reported to the VA client 104 and stored in the SM DB database 108. In addition, new and resolved vulnerabilities cause special policy events to be generated to the SM DB 108; and Policy-sanctioned and Non-policy-sanctioned applications are probed by the VA server 102. Probing of sanctioned applications is reported using the policy for the scanner, which indicates, e.g. in a typical .pdx file 121, that no problem is in evidence. Probing of non-sanctioned applications is reported using the policy for the network object, which indicates, e.g. in a typical .pdx file 121, that an unexpected service violation has occurred for this network host. This information is stored in the SM DB database 108.

The user examines the results of the scan at any time via web pages generated by the Apache/Tomcat server 122. Normal policy monitoring results are now enhanced by the scanner to contain:

A complete list of the discovered and resolved vulnerabilities in the network at the current time;

Policy events for probing of sanctioned and non-sanctioned applications. In one embodiment of the invention only non-sanctioned applications are represented as policy violations; and Policy events representing newly discovered or newly resolved vulnerabilities in sanctioned applications. These events represent single points in time that may be queried historically, in contrast to the vulnerability events for the current time which have only current significance.

It should be appreciated that a scanner need not be co-resident with a monitor, and further that other embodiments of the invention can comprise m multiple monitors and n multiple scanners, such that the m monitors and n scanners are all operating on the same network.

Conceptual Model

In one embodiment of the invention, the policy-based monitor system 100, such as SecurVantage™ Monitor, is assigned one or more subnets to scan. Typically, such subnets include subnet(s) being directly monitored by the policy-based monitor system, as well as adjacent, non-monitored, subnets. It should be appreciated that a subnet may be assigned to multiple policy-based monitor systems, such as to multiple SecurVantage™ Monitors.

Within the studio module, each addressable network object has a set of scanning properties. Such properties determine whether:

The network object should be scanned at all;
The network object should be scanned for application-level vulnerabilities only; and The network object should be scanned for both application-level vulnerabilities and open ports/services that violate policy.

It should be appreciated that, by definition, each addressable network object excludes the Internet as a whole, but not individual hosts that are contained within the Internet.

Such scanning properties are modeled by means of scanning relationships, as follows: each scanner, e.g. SecurVantage™ or other, is modeled by a scanner network object; in the properties panel of the scanner network object, a pane displaying the containment hierarchy of all defined network objects, i.e. a tree view, is used to identify which network objects are to be scanned and which are not.

When a network object is selected, by default all network objects it contains are also selected, but they may be explicitly deselected.

When a network object is selected as a scanning target, the studio module 120 automatically generates a set of scanning relationships for that object which represent a combination of the policy for the scanner and the policy for the network object with respect to the policy monitoring system. The scanning relationships determine how traffic from the scanner to that object is to be classified and are derived from the effective policy for that network object. By default, relationships are created according to the Policy Merging Algorithm, below, having as the target the scanned network object and as the initiator the scanner itself. It should be appreciated that the user can customize the outcome associated with each scanning relationship.

Policy Merging Algorithm

In one embodiment of the invention, the combination of the policy for the scanner and the policy for the monitor are combined using the following policy merging algorithm:

For each network object in a network security policy:
For each offered service in said network object:
If the initiator in the policy relationship includes the scanner itself, the scanning relationship is assigned to the same outcome as that of the policy relationship;
If the initiator does not include the scanner, the outcome Probed is assigned, by default, to the scanning relationship, the meaning of the outcome Probed being defined elsewhere in the studio module 120. That is Probed may be configured to be a violation or not;
For all non-offered services in said network object:
The policy relationship is left unchanged, i.e. a particular violation that is configured for said non-offered service will continue to be the policy.

After such policy merging algorithm is applied, the combined policy result is displayed in the scanner object and in each network object. These results may be further changed by the user. Thus, by manipulating the outcomes associated with the scanning relationships, a user can affect the criticality of a specific open service, from OK (ignore the port scan) to CRITICAL.

Non-sanctioned applications, which are visible through open ports and services, are reported as monitored policy violations called "monitored events." Application-level vulnerabilities are reported by means of a special type of monitored event called a vulnerability event. The vulnerability event indicates the host where the vulnerability was detected, the protocol and service affected, as well as specific details of the vulnerability.

In most respects, vulnerability events are handled in a similar fashion to network events. They are summarized and rolled-up. Using a studio analyzer module, such as the SecurVantage™ Studio Analyzer, a vulnerability event can be drilled down from to get technical details of the actual vulnerability, similarly to protocol event details are obtained when drilling down through a network event. Vulnerability events with an assigned severity of CRITICAL generate alerts to all configured recipients of the policy-based monitor system alerts.

When a vulnerability is discovered on a given host such vulnerability is reported as a vulnerability event and stored in the policy-based monitor system database 108, such as SecurVantage™ Monitor database, alongside the network event data. Such vulnerability events are, thus, visible through the policy-based enterprise manager system user interface, such as Enterprise Manager UI, and the studio analyzer module, such as SecurVantage™ Studio Analyzer. The vulnerability events are also stored in a separate table in database 108, the vulnerability event table, where each is maintained indefinitely, i.e. until such vulnerability disappears or the host is removed from the network. It should be appreciated that this persistent repository of vulnerability data can be queried to determine the status of any scanned host on the network.

In a live data page of the policy-based enterprise manager system, such as in Enterprise Manager UI's Live Data page, all vulnerability events generated during the specified query interval are collated under a pseudo reporting element, referred to herein as the Vulnerability Scanners reporting element. In one embodiment of the invention, such Vulnerability Scanners reporting element is shown at the bottom of a set of top ten reporting elements as an $11^{th}$ row. Thus, users can easily access such vulnerability events even if their volume is low.

When a previously detected vulnerability disappears, a vulnerability event is also generated, with an appropriate outcome name, such as Vulnerability Removed, and a criticality specified in the policy, set to MONITOR by default. The vulnerability event is then removed from the vulnerability event database.

If a previously scanned host cannot be found in a subsequent scan, a vulnerability event with an outcome of Unreachable and a criticality of WARNING is generated. A similar event is generated if a subnet configured for scanning cannot be reached. If the host remains unreachable for a period that exceeds a user-defined time interval, referred to herein as the expiration interval, then all vulnerability events pertaining to that host are removed from the vulnerability event database.

The vulnerability event data can also be integrated into the PDD 114 accessible through the policy-based enterprise manager system user interface, such as Enterprise Manager UI. Each network object page includes a link to vulnerability information about that network object. Unlike the remainder of the PDD 114, such vulnerability information is generated dynamically by querying the vulnerability event database. The vulnerability information is rolled up by host IP address and vulnerability severity, as identified by the outcome component assigned to the events.

Using the policy-based enterprise manager system user interface the user configures how often a network scan is to take place, e.g. daily or weekly, and the maximum network bandwidth that it should utilize. This allows a network operator to schedule scans during off-peak periods and to limit network bandwidth utilization to an acceptable level.

Using the policy-based enterprise manager system user interface the user can also download and/or install updates of the vulnerability definitions. Such updates can be downloaded automatically or on demand from a central website, such as that of the Securify, Inc. Also, installation of the updates can be automatic or on demand. Manual downloads and installation are available if a customer's policy-based monitor system 100 or policy-based enterprise managing system does not have direct access to the Internet.

Adding Scanner to Policy

Figure 2:
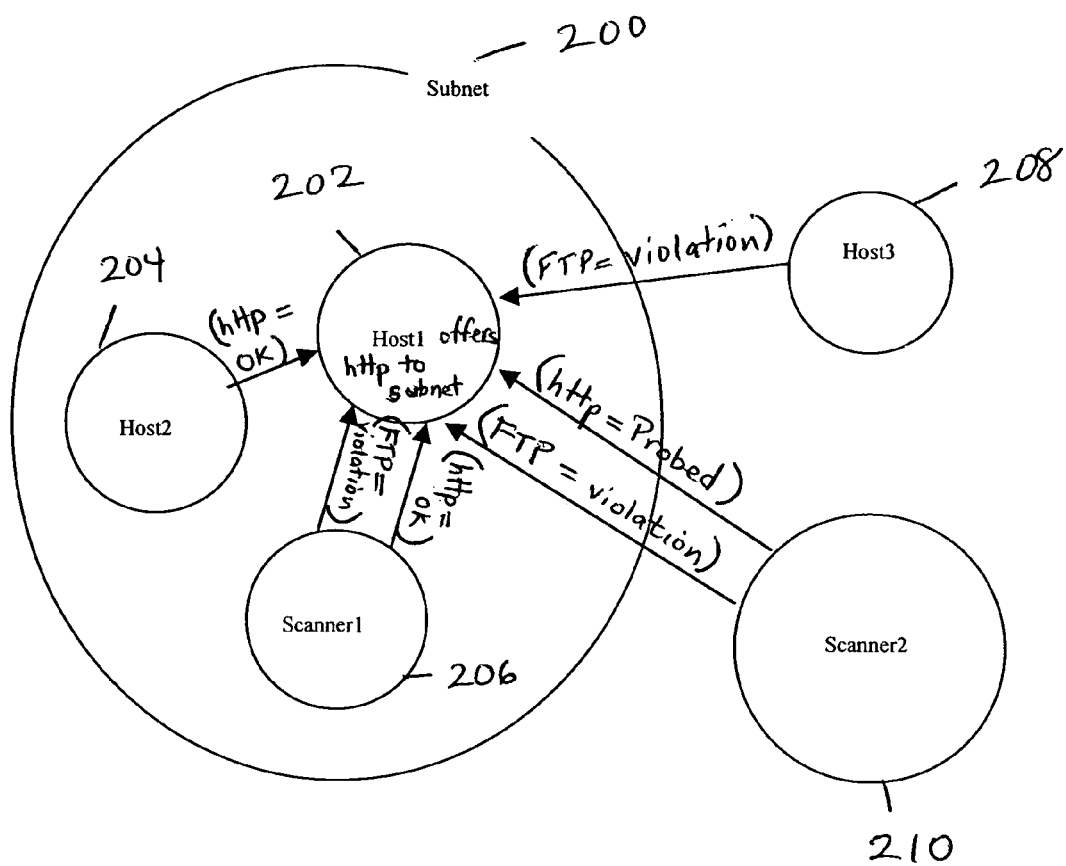
FIG. 2 is a schematic diagram showing a merged policy applied to actions of a scanner according to the invention.

FIG. 2 is a schematic diagram showing a merged policy applied to actions of a scanner according to the invention. For the purposes of this example it is assumed that all policy relationships defined for the hosts in the diagram are assigned an outcome of OK, whereas all scanned relationships are assigned an outcome of Probed. Furthermore, any traffic not explicitly covered by a relationship in the policy is assigned an outcome of Violation. A subnet 200 comprises Host1 202, which offers http to all hosts on the subnet 200, Host2 204 within the subnet 200, and Host3 208 outside the subnet 200. The subnet also comprises a Scanner1 206 which also comprises another host in the subnet 200 (because a scanner machine is also a host on the network). FIG. 2 also shows a Scanner2 210 which is outside the subnet. It should be appreciated that the policy of hosts on the subnet allows for other hosts within subnet 200 to contact them by http. Therefore, Host2 http to Host1 and the host policy applies with outcome (http=OK). Because Scanner1 is also a host in the subnet 200, when it probes Host1, the host policy applies with policy outcome (http=OK). It should be appreciated that because of the applied merged policy, when Scanner2 connects as http to Host1, the policy of the scanner applies with outcome (http=Probed), indicating that while the http service is offered by Host1 it is not offered to hosts outside of subnet 200. FIG. 2 also shows when Scanner2 or Scanner1 connects as FTP to Host1 and FTP not being in either the host or scanner policy, the outcome is (FTP=violation). Host3 is in direct violation, being outside both the host policy and the scanner policy, hence the policy outcome is (FTP=violation).

Monitoring the Scanner

It should be appreciated that according to one embodiment of the invention, the following is true:

The policy-based monitor system 100 knows about the existence, identity, and function of the scanner;

The policy-based monitor system 100 is able to monitor and report on the scanner's probes for sanctioned- and non-sanctioned applications on a target host;

The policy-based monitor system 100 describes the results of the scanner's probes as if the scanner were a special known attacker; and The policy-based monitor system 100 result is superior to that of the scanner because it is able to omit scanner results that are redundant to the network security policy.

It should be appreciated that such scanner so identified and described in the policy-monitor's network security policy also functions to exercise the targets of the policy monitor, so that non-sanctioned services become visible even if no users are currently using them.

Continuous Scanning

Figure 3:
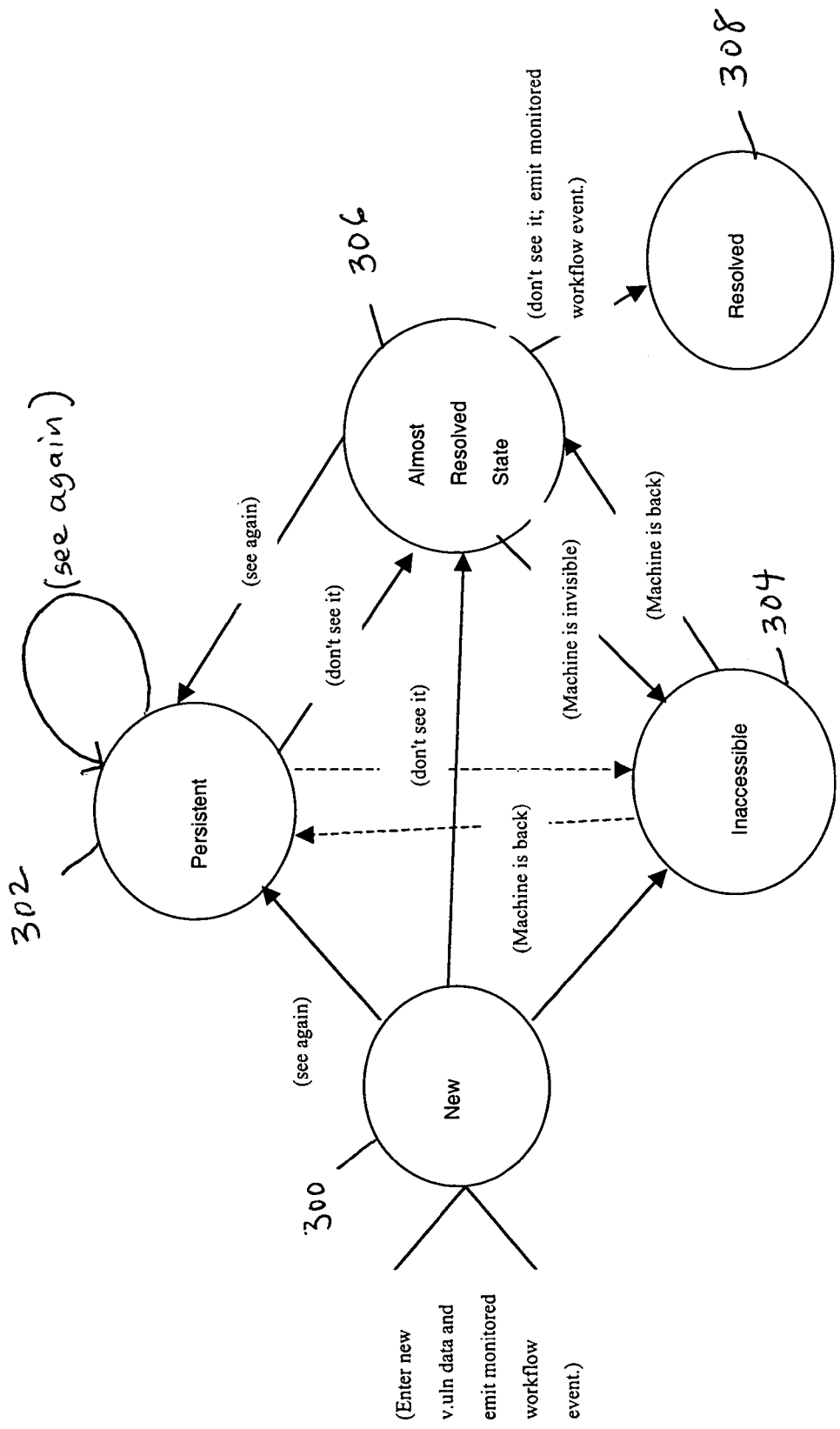
FIG. 3 is a schematic diagram showing a workflow of scanned vulnerability states, which are stored in a repository, and emitted as monitored events according to the invention.

In one embodiment of the invention, vulnerability state information of a system can be derived from repeated events, referred to herein as continuous scanning. FIG. 3 is a schematic diagram showing a workflow of scanned vulnerability states, which are stored in a repository, and emitted as monitored events according to the invention. New vulnerability data is entered into the system and the output is a monitored event. A list of vulnerability states is provided from which a user can determine the following:

which vulnerabilities are new;

how long each vulnerability persists; and which vulnerabilities have been resolved.

A new vulnerability is a workflow item, which is mapped to an emitted monitored event. A resolved vulnerability clears such workflow item, and such action is mapped to a monitored event. A vulnerability whose target host is no longer accessible, e.g. it has been removed from service, indicates a modification to such workflow item, and such action is mapped to a monitored event. Such monitored events are emitted with an outcome, as follows:

Outcome=vulnerability; State=New

Outcome=vulnerability removed; State=Resolved; and

Outcome=host unreachable; State=Inaccessible.

For each of the states hereinabove, a severity can be selected from the scanner, such as Nessus. For example, Nessus severity selections are: severe, informational, and important.

As successive vulnerability scans are executed, the results may be classified according to the state diagram in FIG. 3. Vulnerability state classification provides the user with a better understanding of the total set of vulnerabilities on the scanned network.

Referring to FIG. 3, new vulnerability data enters the system at state new 300 and a monitored event is emitted. If such vulnerability data is seen again, the state becomes persistent 302. If it is not seen again, it becomes almost resolved 306. If the machine on which the vulnerability is detected is no longer visible on the network, the state becomes inaccessible 304 and a monitored event is emitted. From persistent 302, if the vulnerability is detected again, the state remains persistent 302. From almost resolved 306, if a vulnerability is seen again, the stated changes to persistent 302. If the vulnerability is not seen after an amount of time, the state becomes resolved 308 and a monitored event is emitted. If the vulnerability is from a machine which ceases to be visible on the network, the state becomes inaccessible 304. From the inaccessible state, if a machine returns from being invisible from the almost resolved state 306, the state returns to the almost resolved state 306. If a machine returns from being invisible from a persistent state 302, the state returns to the persistent state 302.

Referring to FIG. 1, it should be appreciated that the VA Client 104 maintains a list of hosts that have been detected via previous scanning in SM DB 108. In one embodiment of the invention, the scanner is used to determine the existence of new hosts as well as hosts which have left the subnet in the policy as follows:

If a network host appears that has never been seen by the scanner, a Host found event is emitted; and If a network host previously seen by the scanner is seen no longer to be responding, a Host unreachable event is emitted.

High Level Schematic Design

In one embodiment of the invention, the Nessus remote security scanner is used as an underlying technology for performing the vulnerability scans. But it should be appreciated that other scanners can be used.

The component architecture of one embodiment of the invention can be described with reference to FIG. 1. It should be appreciated that such vulnerability assessment (VA) components run within the policy-based monitor system. The main VA components are:

VA Server 102—performs all vulnerability scans upon request from the VA Client and returns the scan results to the VA Client; and VA Client 104—reads a policy information processed from .pdx file 122 via pdx compiler 124; uses this information to determine which subnets and hosts to scan; reads monitor-level configuration to determine when to perform the scans and the allocated bandwidth for the scan; communicates with the VA Server to perform the scans; processes the scan results; updates the vulnerability tables in the SM DB 108; updates the list of all hosts seen by the scanner in the SM DB 108; and generates vulnerability events that are stored in the monitor database.

Process Manager Process (PMP) 106—is responsible for starting and stopping both the VA Client and VA Server processes.

Functional Specification

VA Server

The Vulnerability Assessment Server 102 performs the function of scanning specified hosts on the network and reporting on application-level vulnerabilities that are found.

In one embodiment of the invention a version of SecurVantage™ uses the Nessus Remote Security Scanner technology to implement this function.

The VA Server 102 receives requests to perform a scan or series of scans from the VA Client 104. The VA Client 104 communicates with the VA server 102 through a TCP socket interface. In one embodiment of the invention the interface between the VA Client and the VA Server is defined by Nessus.

The Scan Request Indicates:

What subnets and/or hosts are to be scanned;

The type of scan to be performed, e.g. low impact scan;

The VA Server scans all available services on the specified hosts and reports on all vulnerabilities found.

The VA Server returns the results of each scan to the VA Client using the same communication channel that is used to request a scan. In one embodiment of the invention, the format of the returned results is defined by Nessus.

The VA Server process is started and stopped by the Process Manager Process (PMP).

The status of the VA Server process can be monitored via the enterprise manager system user interface.

VA Client

The Vulnerability Assessment Client 104 is responsible for controlling all network vulnerability scans, for processing the returned results and storing the relevant information in the policy-based monitor system database 108.

The VA Client runs as a separate process in the policy-based monitor system. It communicates with the VA Server process through a TCP socket interface. The interface between the VA Client and the VA Server is defined by the scanner.

The VA Client's configuration information falls into three categories:

Target information;

Schedule information;

Expiration interval.

The target information is expressed in the policy obtained from a mapping file and defines which hosts are to be scanned.

The schedule information specifies when scans are to take place and is obtained from the monitor configuration file. Vulnerability scans are recurring events and the schedule information merely indicates the periodicity of the event. Following are examples of periodicity that may be specified:

Continuous;

Daily;

Every n days;

Day of the week (weekly); and

Day of the month (monthly).

In addition, the user may specify the time of the day when a scan shall commence, as well as time intervals when scanning should not take place.

The expiration interval specifies how long a vulnerability will remain in the vulnerability event database after it was last detected and is obtained from the monitor configuration file. It must be larger than the time interval between scans and in one embodiment of the invention, it is expressed in weeks.

The VA Client receives application-level vulnerability results through the TCP socket connection it maintains with the VA Server.

Each vulnerability result indicates the IP address of the target host, the service being exercised, e.g. SSH, the type of vulnerability found, and the severity level of the vulnerability. Vulnerabilities are matched to the vulnerabilities in the SM DB 108. The VA client updates such vulnerabilities to reflect the new situation in the network. It also updates the list of hosts seen by the scanner. Depending on the new vulnerability state, for each vulnerability seen, the vulnerability may also be mapped into a network event as follows:

The IP address of the scanning network interface in the policy-based monitor system 100 is used as the source IP address and mapped into the name of the network object that represents the VA scanner.

The IP address of the target host is used as the destination IP and mapped to the appropriate (most specific) network object name.

The destination DNS name is assigned to the DNS name of the target host, if available.

The transport protocol to which the vulnerability applies (TCP, UDP or ICMP) is assigned to the service protocol and the base protocol. The transport protocol's IP protocol ID is assigned to the protocol number field. For host-level vulnerabilities, e.g. OS vulnerabilities, the transport protocol is set to Host. The IP protocol ID is set to a predetermined value, such as zero.

The application protocol to which the vulnerability applies, e.g. http, is assigned to the service. For host-level vulnerabilities the service is set to OS.

The port where the vulnerability was found is assigned to the destination port. For host-level vulnerabilities the destination port is set to a predetermined value, such as zero.

The vulnerability is mapped into a builtin outcome and an outcome component. There are three possible outcomes that may be assigned to a vulnerability event. They are:

Vulnerability—a vulnerability not previously reported against this target host has been found. This outcome is used whenever a vulnerability is first found. It consists of three outcome components, each with a distinct, user-configurable, criticality level:

Severe

Important

Informational

Vulnerability Removed—a previously reported vulnerability that is no longer found in this target host. It has a single outcome component, as follows:

Cleared

Unreachable—a subnet or previously scanned host cannot be reached by the scanner. It has a single outcome component as follows:

Not Scanned

The severity of the vulnerability, as defined by Nessus, is mapped into one of the outcome components defined above. The mapping is as follows:

Nessus output level HIGH is mapped to Severe;

Nessus output level WARNING is mapped to Important; and

Nessus output level NOTE is mapped to Informational.

The event owner is the owner of the outcome, the service, or the target network object, in that order.

The monitor is the name of the monitor where the VA server and client are running.

The collection point is the collection point assigned to the monitor where the VA server and client are running.

The event time is assigned the time at which the vulnerability was last reported.

Each vulnerability event comprises additional information detailing the nature of the vulnerability. These additional details are encapsulated in the form of a vulnerability details record similar in nature to a protocol details record. The vulnerability details record consists of the following fields:

Common Identifier, a string containing one or more identifiers from common vulnerability repositories such as the Common Vulnerabilities and Exposures (CVE) number;

Description, a string containing a detailed description of the vulnerability. The description may contain a dynamic portion detailing an aspect of the vulnerability that is specific to the target host, e.g. the user name associated with an insecure account on the host;

First Found, a timestamp for when the vulnerability was first detected;

Last Found, a timestamp for when the vulnerability was last detected.

The vulnerability events thus stored in the policy-based monitor system database 108 can be viewed, in a manner identical to other network events, by the studio analyzer module, such as the SecurVantage™ Studio Analyzer, and the enterprise manager system user interface, such as Enterprise Manager UI.

Vulnerability events are also stored in the vulnerability event table within the SM DB 108 where they are maintained for the lifetime of the vulnerability, i.e. until the vulnerability disappears or the host to which the vulnerability event pertains is removed from the network.

When a vulnerability is reported by the VA Server, the VA Client queries the vulnerability event database to determine if that vulnerability has already been reported by a previous scan. If not, a vulnerability event is generated and stored in both the policy-based monitor system database 108 and the vulnerability event database. The vulnerability event is assigned the outcome Vulnerability and an outcome component representing the severity of the vulnerability as reported by the VA Server.

Vulnerability events with an assigned severity of CRITICAL are also reported as alerts to all configured recipients of policy-based monitor system alerts.

If a previously reported vulnerability is cleared, i.e. is found to no longer exist in a subsequent scan, the VA Client generates a vulnerability event to indicate that the vulnerability has been removed from the host. In one embodiment of the invention, such vulnerability event is identical to the event that reported the vulnerability, except that the outcome is assigned to Vulnerability Removed and its single outcome component Cleared. Such vulnerability event is then removed from the vulnerability event database.

If a subnet assigned to a given VA Scanner cannot be reached, the VA Client generates a vulnerability event to indicate this fact. The outcome assigned to this event is Unreachable, and the outcome component Not Scanned. A vulnerability event with the same outcome and outcome component is also generated if a previously scanned host cannot be reached in a subsequent scan. The status of the vulnerability event is also updated in the vulnerability event database.

If a host remains unreachable for a period that exceeds the specified expiration interval, all vulnerability events pertaining to that host are removed from the vulnerability event database.

The VA Client process is started and stopped by the Process Manager Process (PMP) 106.

The status of the VA Client process can be monitored via the enterprise manager system user interface.

The scanning schedule, bandwidth utilization, and expiration interval configuration parameters can be modified using the enterprise manager system user interface.

Studio

In one embodiment of the invention the studio module, such as SecurVantage™ Studio uses a scanner network object to represent the VA capability available in each policy-based monitor system, such as SecurVantage™ Monitor. A scanner network object may also be used to represent a third party network scanner that is not a SecurVantage™ Scanner. The VA scanner network object is given the IP address of the policy-based monitor system's 100 network interface used for scanning. The studio module user may create scanner network objects at any point during policy development.

The properties window of a scanner network object includes a section with a tree-view of all the network objects that have been defined in the policy (subnets, hosts, groups of subnets/hosts, etc.). Next to each network object there is a checkbox to indicate whether or not the network object is to be scanned. When a network object is selected/deselected, all the network objects that it contains are also selected/deselected.

When a network object is selected as a scanning target, Studio automatically generates a set of scanning relationships for that object. The scanning relationships determine how traffic from the scanner to that object is to be classified and are derived from the effective policy for the scanned network object. By default, the following relationships are created, having as the target the scanned network object and as the initiator the scanner itself. It should be appreciated that the user can customize the outcome associated with each scanning relationship.

If, in the network object's effective policy, a given service is offered, there are two possible outcomes that can be associated with the scanning relationship:

If the initiator in the policy relationship includes the scanner itself, the scanning relationship has, by default, the same outcome as that of the policy relationship.

If the initiator does not include the scanner, the outcome Probed is assigned, by default, to the scanning relationship. By default, the outcome Probed has a criticality of WARNING associated with all its outcome components that denote a successful connection or two-way exchange of connectionless data.

All other services not explicitly offered, are modeled by the generic TCP/UDP/ICMP relationships and, thus, by default, will have the same outcome as that of the policy relationship. It should be appreciated that a scanning relationship is created for the generic services so that the user may change the associated outcome, if desired.

The scanning relationships are displayed in a separate pane within the scanner network object's properties window. They are sorted primarily by scanned network object name and secondarily by service. The user may modify the outcome associated with each scanning relationship but neither the target network object nor the service shall be modifiable.

The scanning relationships are also visible in the properties window of a scanned network object under a separate pane from all the policy relationships. The scanning relationships are sorted primarily by service and secondarily by scanner network object.

Vulnerability events are visible through the studio analyzer module interface.

Using the studio analyzer module the user can query both the vulnerability events stored in the policy-based monitor system database 108 and the vulnerability events stored in the vulnerability event database. A separate interface is provided to query the latter database.

When the PDD 114 is generated by the PDD generator the user has the option of specifying whether or not the PDD includes vulnerability information. If vulnerability information is to be included, the studio module queries the appropriate enterprise manager and generates static HTML pages containing the complete set of vulnerability data associated with each of the defined network objects in the policy.

Enterprise Manager UI

Vulnerability events are viewable through the enterprise manager system user interface. They are indistinguishable from other network events.

In a live data page of the policy-based enterprise manager system, such as in Enterprise Manager UI's Live Data page, all vulnerability events generated during the specified query interval are collated under a specially named reporting element, referred to herein as the Vulnerability Scanners reporting element. In one embodiment of the invention, such Vulnerability Scanners reporting element is shown at the bottom of a set of top ten reporting elements as an $11^{th}$ row. Thus, users can easily access such vulnerability events even if their volume is low.

In some embodiments of the invention, the vulnerability event database may be accessed via an EM web interface 125 using database replication or a proxy request mechanism, e.g. HTTP proxy.

Vulnerability alerts are viewable through the enterprise manager system user interface's alert page and they are handled equivalently to other network events. All alert management functions in the enterprise manager system user interface are applicable to vulnerability alerts.

The PDD generator program 112 is invoked as part of the policy update process. The PDD HTML document is placed into a specified directory and made accessible through the enterprise manager system user interface.

In the PDD 114, each network object page includes a link to vulnerability information pertaining to the network object. This link invokes a JSP with the appropriate parameters so as to execute a query against the vulnerability events in the database. The JSP constructs an HTML page(s) with vulnerability information sorted by the IP address of the target host. For each target host, a list of vulnerabilities that affect it is displayed. Clicking on each individual vulnerability event provides the vulnerability details information.

A PDD 114 accessed through an enterprise manager system provides a view of vulnerability information for an entire policy domain. A PDD 114 accessed through the policy-based monitor system 100 provides visibility only to the hosts scanned by the VA Server on that monitor.

Through the enterprise manager system user interface the user specifies the following configuration information:
  Scanning schedule; and
  Bandwidth utilization.

This configuration information is stored in the policy-based monitor system 100 configuration file.

Through the enterprise manager system user interface the user can ascertain the status of the VA Client 104 and VA Server 102 processes as well as start and stop these processes.

Furthermore, the enterprise manager system user interface allows the user to manage the update process for the security scanner updates, such as Nessus Vulnerability Plugins. The following update modes are supported:
  Scheduled updates—the user schedules how frequently to check the plugin repository for new updates. When a new plugin is found, it is downloaded and distributed to all policy-based monitor systems. The VA Server 102 on the monitors is restarted to take advantage of the new plugin(s).
  On-demand updates—the user retrieves the updates from the plugin repository manually and places them into the filesystem of the enterprise manager machine. Using the enterprise manager system user interface the user instructs the enterprise manager machine to distribute the update to all policy-based monitor systems.

Example Views

Following are views taken from an exemplary policy-based monitor system and studio module, SecurVantage™ Monitor and SecurVantage Studio™, respectively.

Figure 4:
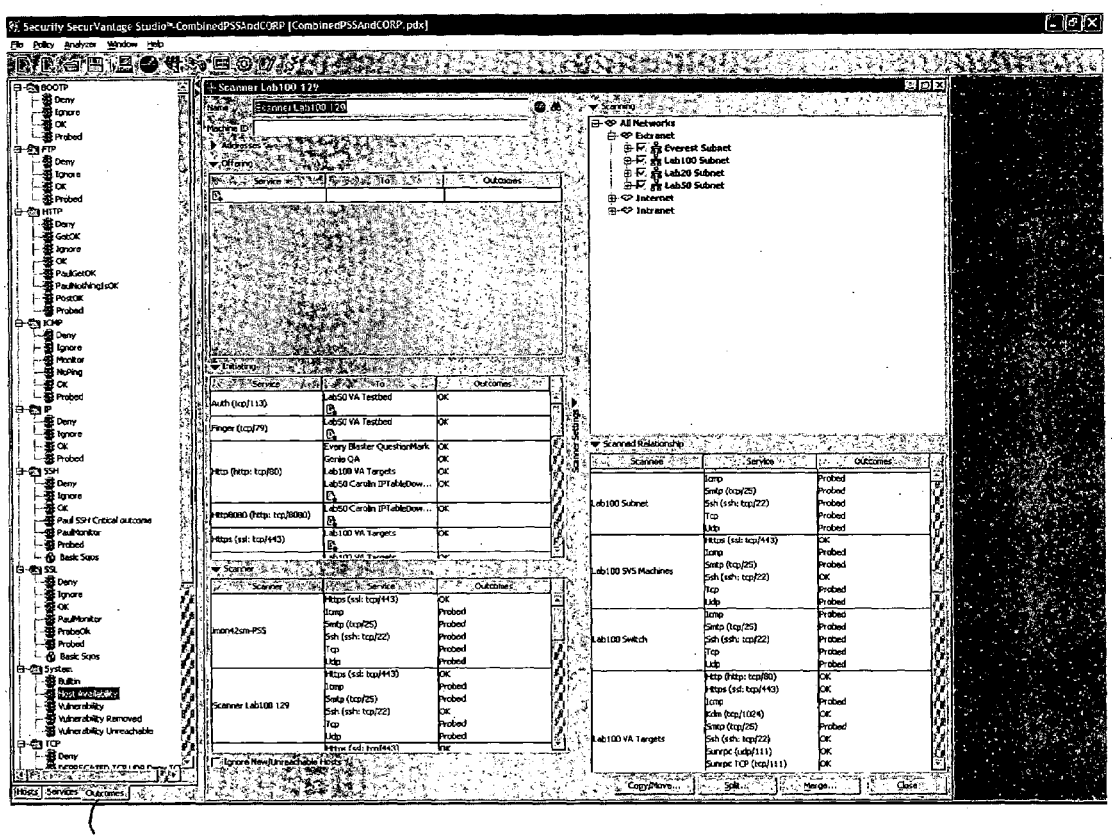
FIG. 4 is an example view from the studio module according to the invention.

FIG. 4 is an example view from the studio module according to the invention. The outcomes tab 402 is selected in the panel window on the left, showing possible outcomes of events. From the interactive screen, policy for the scanner and scanning relationships are further defined.

Figure 5:
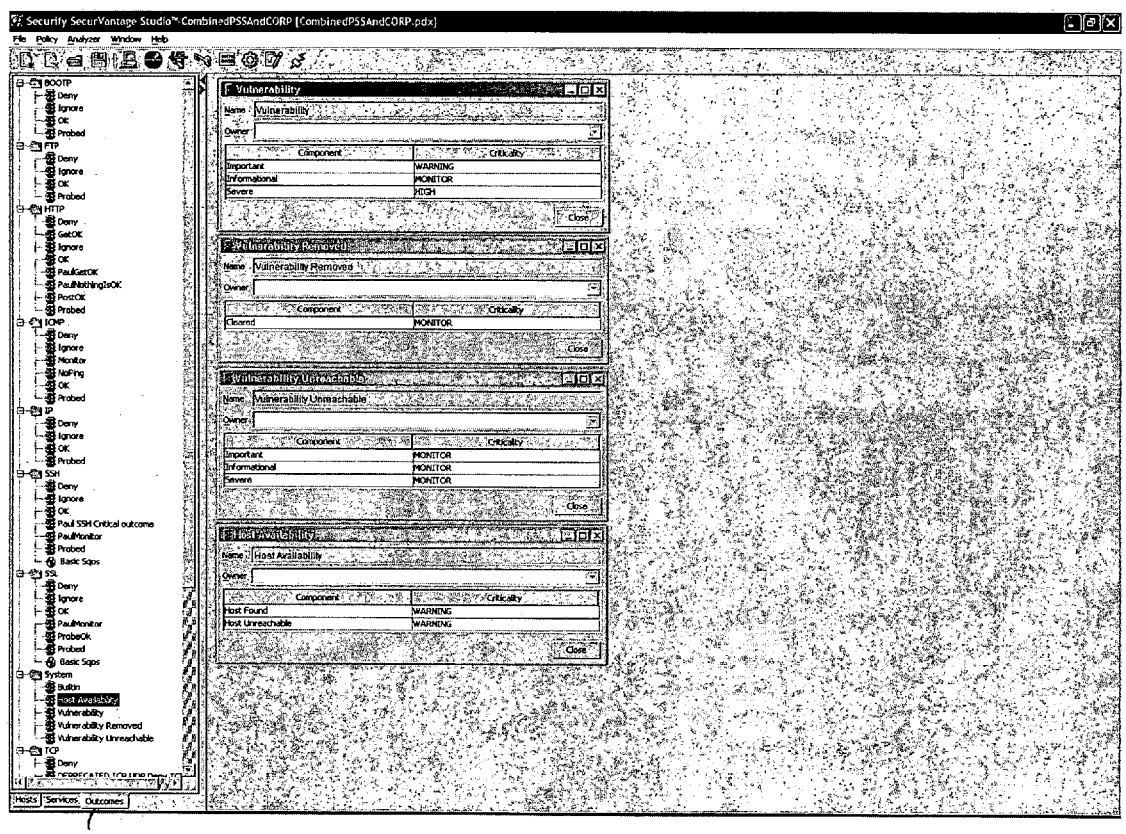
FIG. 5 is an example view from the studio module according to the invention.

FIG. 5 is an example view from the studio module according to the invention. The outcomes tab 402 is selected in the panel window on the left, showing possible outcomes of events. Possible emitted events for vulnerabilities are shown along with the respective components and criticalities.

FIG. 6 is an example view of a Web page from the policy-based monitor system user interface according to the invention. Specifically, a page from the SecurVantage™ Monitor system is shown. The Vulnerabilities tab 600 is selected, whereby a complete list of vulnerabilities is shown in order of the criticality component, severe, important, and informational. It should be appreciated that among other information, each persistent state was seen twice (Count=2). It should also be appreciated that relevant CVE and IAVA data is displayed.

FIG. 7 is an example view of a Web page from the policy-based monitor system user interface according to the invention. The Vulnerabilities tab 600 is selected, whereby the specific view shown is Scanner Summary by Reporting Element, of which there are three in this example.

Figure 8:
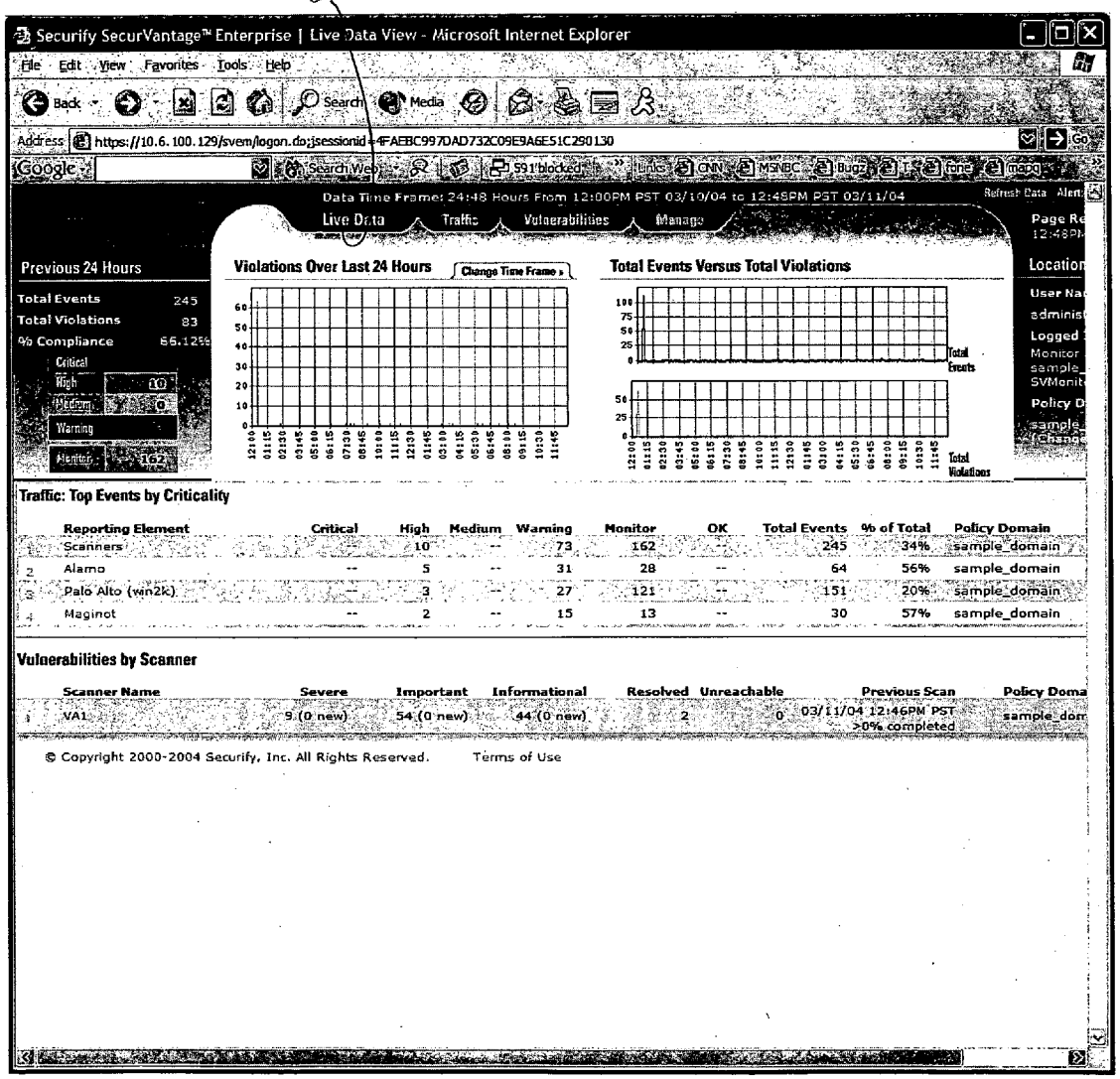
FIG. 8 is an example view of a Web page from the policy-based monitor system user interface according to the invention.

FIG. 8 is an example view of a Web page from the policy-based monitor system user interface according to the invention. The Live Data tab 800 is selected, whereby data from the previous 24 hours is shown. It should be appreciated that among other information, total events, total violations, and percent compliance is shown. Graphs showing total events versus total violations make is easy for the viewer to detect by visual means the vulnerability of the system at hand. Top events sorted by criticality is displayed in list form which makes it easy for the viewer to glean which reporting elements are impacted the most.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. In a policy-based monitor system, a network security system for vulnerability assessment (VA) comprising:
 a VA client for requesting vulnerability scans, for processing returned results, and for storing relevant data coupled to said request;
 a VA server for receiving said VA client request for vulnerability scans, for performing said vulnerability scans, and for returning scan results to said VA client;
 a vulnerability scan result comprising:
  an IP address of a target host;
  a service being exercised;
  a type of vulnerability; and
  a security level of said vulnerability;
 wherein responsive to, and dependent on, an associated vulnerability state, at least one returned vulnerability scan result is mapped into a vulnerability network event, said vulnerability network event being accessible to an analyzing module coupled to a studio module and being accessible to an enterprise-level user interface, said vulnerability network event being maintained for the lifetime of said vulnerability;
 a module for removing all vulnerability events pertaining to a host that is unreachable for a time exceeding a specified time; and
 in response to a policy file being compiled, means for a pdx compiler computing a complete set of IP addresses to be scanned and for outputting said set of IP addresses to a file as input for said VA client.

2. The network security system of claim 1, wherein said VA server reports on application-level vulnerabilities.

3. The network security system of claim 1, wherein a vulnerability scan request comprises at least one of:
 subnets and hosts to be scanned; and
 type of scan to be performed.

4. The network security system of claim 1, wherein configuration information for said VA client comprises at least one of:
 target information;
 schedule information; and
 expiration interval.

5. The network security system of claim 1, containing a mapping function for the purpose of mapping said vulnerability scan result to said vulnerability network event, comprising at least one of:
 a mapping function that uses an IP address of a scanning network interface in said policy-based monitor system as a source IP address and that maps said IP address into a name of a network object that represents a VA scanner;
 a mapping function that uses an IP address of a target host as a destination IP and that maps said IP address to an appropriate network object name;
 a mapping function that assigns a transport protocol to which said vulnerability applies to a service protocol and a base protocol, wherein said transport protocol's IP protocol ID is assigned to a protocol number field and, wherein said for host-level vulnerabilities, said transport protocol is set to Host and said IP protocol ID is set to a first predetermined value;
 an application protocol to which vulnerability applies to a service for a mapping function that assigns network level vulnerabilities, or to a specific indicator string for vulnerabilities that apply only to a host but not to its network connection;
 a mapping function that assigns a port where vulnerability is discovered to a destination port, wherein for host-level vulnerabilities said destination port is set to a second predetermined value;
 a function that maps vulnerability into an outcome and an outcome component, wherein said outcome is one of a plurality of possible outcomes assignable to a vulnerability event, said possible outcomes comprising at least:
  a vulnerability outcome, wherein a vulnerability not previously reported against a target host is determined, wherein said outcome is used whenever a vulnerability is first found, and wherein said outcome comprises at least one of outcome components, each with a distinct criticality level, wherein said vulnerability outcome components indicate if said vulnerability outcome is at least one of:
   severe;
   important; and
   informational;
  a vulnerability removed outcome, wherein a previously reported vulnerability that is no longer found in a target host is determined, wherein said outcome has a single outcome component indicating said vulnerability is cleared; and
  an unreachable outcome, wherein a subnet or previously scanned host cannot be reached by said scanner and has a single outcome component indicating said previously scanned host or subnet can no longer be scanned;
 a mapping function that assigns an event owner as owner of an outcome, service, or target network object, and in such order;
 a mapping function that assigns a monitor a name of a monitor wherein said VA server and client are running;
 a mapping function that assigns a collection point to a monitor where said VA server and client are running;
 a mapping function that assigns an event time to a time at which said vulnerability was last reported; and
 at least one vulnerability details record comprising at least one of the following fields:
  a common identifier field, a string containing one or more identifiers from common vulnerability repositories;
  a description field, a string containing a detailed description of said vulnerability, wherein description is capable of containing a dynamic portion detailing an aspect of said vulnerability that is specific to said target host;
  a first found field, a timestamp for when said vulnerability was first detected; and
  a last found field, a timestamp for when said vulnerability was last detected.

6. The network security system of claim 5,
 wherein a Nessus like security server severity of said vulnerability is mapped into one of said outcome components as follows:
  Nessus like security server output level HIGH is mapped to Severe;
  Nessus like security server output level WARNING is mapped to Important; and
  Nessus like security server output level NOTE is mapped to Informational.

7. The network security system of claim 1, further comprising:
 in response to a vulnerability reported by said VA Server, means for said VA client querying said vulnerability event database to determine if said vulnerability has already been reported by a previous scan, wherein if not, a vulnerability event is generated and stored in both said policy-based monitor system database and said vulnerability event database, wherein said vulnerability event is assigned a vulnerability outcome and an outcome component representing a severity of said vulnerability as reported by said VA server.

8. The network security system of claim 7, further comprising:
means for reporting a vulnerability event having an assigned severity of a predetermined value as an alert to all configured recipients of policy-based monitor system alerts.

9. The network security system of claim 1, further comprising:
in response to a previously reported vulnerability being cleared, means for said VA client generating a vulnerability event to indicate that said vulnerability is removed from a host, wherein said vulnerability event is then removed from said vulnerability event database.

10. The network security system of claim 1, further comprising:
in response to a host previously detected on said network by a given VA scanner is determined not reachable in a subsequent scan, means for said VA client generating an associated vulnerability event and updating an associated status of said associated vulnerability event in said vulnerability event database.

11. The network security system of claim 1, further comprising:
means for said pdx compiler defining a subset of specific IP addresses to be removed from said complete set of IP addresses, whereby said subset of specific IP addresses will not be scanned.

12. The network security system of claim 1, further comprising:
in response to a policy file being compiled, means for said pdx compiler computing a set of IP addresses designated not to be scanned and outputting said set of IP addresses designated not to be scanned to a file as input for said VA client.

13. The network security system of claim 1, said enterprise-level user interface further comprising:
means for specifying configuration information;
means for ascertaining status of processes of said VA client and said VA server; and
means for managing an update process for security scanner updates.

14. The network security system of claim 1, further comprising at least one of:
means for said policy-based monitor system monitoring a scanner; and
means for a scanner exercising a network for said policy-based monitor system.

15. The network security system of claim 1, further comprising:
means for determining vulnerability state information of a network using a continuous scanning technique.

16. The network security system of claim 15, wherein said vulnerability state information comprises information indicating at least one of:
which vulnerabilities are new;
how long each vulnerability persists; and
which vulnerabilities have been resolved.

17. The network security system of claim 15, further comprising:
means for mapping a new vulnerability to an emitted monitored event with outcome vulnerability; and
means for mapping a resolved vulnerability to an emitted monitored event with outcome vulnerability resolved.

18. The network security system of claim 15, further comprising:
means for determining when new vulnerability data is received at state new and emitting a monitored event, wherein if such vulnerability data are seen again, then for assigning a state to persistent, and if said data are not seen again, then assigning a state to almost resolved;
means for determining if a machine on which vulnerability is detected is no longer visible on said network and for assigning state inaccessible and emitting a monitored event;
from a persistent state, means for determining if vulnerability is detected again and for keeping state at persistent;
from an almost resolved state, means for determining if vulnerability is seen again and for changing state to persistent, and if said vulnerability is not seen after a predetermined amount of time, for assigning state to resolved and emitting a monitored event;
means for determining if vulnerability is from a machine which ceases to be visible on said network and for assigning state to inaccessible; and
from an inaccessible state, means for determining if a machine returns from being invisible from an almost resolved state and for returning state to said almost resolved state, and for determining if a machine returns from being invisible from a persistent state and returning said state to persistent.

19. The network security system of claim 15, further comprising:
means for using a scanner to determine existence of new hosts and hosts which are no longer present in a subnet in the policy of said policy-based monitoring system, and wherein:
if a network host appears and an IP address is not represented by a record in said vulnerability state information, a Host found event is emitted; and
if a network host is covered by said record in said vulnerability state information but is not seen by said scanner, a Host unreachable event is emitted.

20. The network security system of claim 15, further comprising:
means for using a scanner to derive new hosts, as well as hosts which are no longer present in said network in said policy of said policy-based monitoring system using said determined vulnerability state information.

21. The network security system of claim 15, wherein said vulnerability state information comprises at least one of:
new;
persistent;
inaccessible;
almost resolved; and
resolved.

22. The network security system of claim 1, further comprising:
a network security policy for detecting presence of a running scanner and for monitoring said network, wherein scanner events are not presented as a security attack on said network.

23. In a policy-based monitor system, a studio module comprising at least one of:

a scanner network object comprising at least one of:

VA capability in said policy-based monitor system, wherein said scanner network object is given an IP address of a network interface coupled to said policy-based monitor system used for scanning; and a third-party network scanner, wherein said scanner network object is given an IP address of said third-party scanner used for scanning;

wherein said studio module provides capability for a user to create scanner network objects at any point during policy development, said scanner objects representing in said policy activity on said network generated by a vulnerability scanner scanning said network; and means for automatically generating a set of scanning relationships in said policy of said policy based monitoring system for one or more of said network objects selected as a scanning target, wherein said scanning relationships determine how traffic from an associated scanner to said network objects is classified, and wherein said scanning relationships are derived from an associated policy for said network object;

wherein said means for generating a set of scanning relationships further comprises a means for assigning at least one of two outcomes associated with said scanning relationship if a given service is offered in said network object's policy, said two outcomes comprising:

if an initiator in a policy relationship includes a scanner itself, then said scanning relationship has a same outcome as that of said policy relationship; and if an initiator does not include a scanner, then an outcome Probed is assigned to said scanning relationship, wherein said outcome Probed has a criticality depicting a violation of said target network object's policy associated with all of its outcome components that denote a successful connection or two-way exchange of connectionless data.

24. In a policy-based monitor system, a studio module comprising at least one of:

a scanner network object comprising at least one of:

VA capability in said policy-based monitor system, wherein said scanner network object is given an IP address of a network interface coupled to said policy-based monitor system used for scanning, and a third-party network scanner, wherein said scanner network object is given an IP address of said third-party scanner used for scanning;

wherein said studio module provides capability for a user to create scanner network objects at any point during policy development, said scanner objects representing in said policy activity on said network generated by a vulnerability scanner scanning said network; and means for said enterprise-level user interface accessing a policy description document generated as part of a policy update process, wherein said policy description document comprises a network object page, comprising a link to vulnerability information pertaining to said network object, wherein said policy description document provides a view of vulnerability information for an entire policy domain, and wherein a policy description document accessed through said policy-based monitor system provides visibility only to hosts scanned by said VA Server.

25. In a policy-based monitor system, a studio module comprising at least one of:

a scanner network object comprising at least one of:

VA capability in said policy-based monitor system, wherein said scanner network object is given an IP address of a network interface coupled to said policy-based monitor system used for scanning; and a third-party network scanner, wherein said scanner network object is given an IP address of said third-party scanner used for scanning;

means for automatically merging a host policy and a scanner policy;

wherein said studio module provides capability for a user to create scanner network objects at any point during policy development, said scanner objects representing in said policy activity on said network generated by a vulnerability scanner scanning said network; and wherein said merged policy comprises at least one of:

outcomes per host policy, wherein host policy applies to scanner as client host; and probed outcomes, wherein host policy does not apply to scanner as client host.

26. For a policy-based monitor method, a method for network security for vulnerability assessment (VA) comprising the steps of:

requesting vulnerability scans, processing returned results, and storing relevant data coupled to said request and results in a module;

receiving said request for vulnerability scans, performing said vulnerability scans, and transmitting scan results to a VA client;

returning vulnerability scan results that are mapped into a vulnerability network event responsive to, and dependent on, an associated vulnerability containing a mapping function for mapping said vulnerability scan result to said vulnerability network event, comprising at least one of:

a mapping function that uses an IP address of a scanning network interface in said policy-based monitor system as a source IP address and that maps said IP address into a name of a network object that represents a VA scanner;

a mapping function that uses an IP address of a target host as a destination IP and that maps said IP address to an appropriate network object name;

a mapping function that assigns a transport protocol to which said vulnerability applies to a service protocol and a base protocol, wherein said transport protocol's IP protocol ID is assigned to a protocol number field and, wherein said for host-level vulnerabilities, said transport protocol is set to Host and said IP protocol ID is set to a first predetermined value;

an application protocol to which vulnerability applies to a service for a mapping function that assigns network level vulnerabilities, or to a specific indicator string for vulnerabilities that apply only to a host but not to its network connection;

a mapping function that assigns a port where vulnerability is discovered to a destination port, wherein for host-level vulnerabilities said destination port is set to a second predetermined value;

a function that maps vulnerability into an outcome and an outcome component, wherein said outcome is one of a plurality of possible outcomes assignable to a vulnerability event; said possible outcomes comprising at least:

a vulnerability outcome, wherein a vulnerability not previously reported against a target host is determined, wherein said outcome is used whenever a vulnerability is first found, and wherein said outcome comprises outcome components, each with a distinct criticality level, wherein said vulnerability outcome components indicate if said vulnerability outcome is at least one of:
  severe;
  important; and
  informational;
a vulnerability removed outcome, wherein a previously reported vulnerability that is no longer found in a target host is determined, wherein said outcome has a single outcome component indicating said vulnerability is cleared; and
an unreachable outcome, wherein a subnet or previously scanned host cannot be reached by said scanner and has a single outcome component indicating said previously scanned host or subnet can no longer be scanned;
a mapping function that assigns an event owner as owner of an outcome, service, or target network object, and in such order;
a mapping function that assigns a monitor a name of a monitor wherein said VA server and client are running;
a mapping function that assigns a collection point to a monitor where said VA server and client are running;
a mapping function that assigns an event time to a time at which said vulnerability was last reported; and
at least one vulnerability details record comprising at least one of the following fields:
  a common identifier field, a string containing one or more identifiers from common vulnerability repositories;
  a description field, a string containing a detailed description of said vulnerability, wherein description is capable of containing a dynamic portion detailing an aspect of said vulnerability that is specific to said target host;
  a first found field, a timestamp for when said vulnerability was first detected; and
  a last found field, a timestamp for when the said vulnerability was last detected.

27. The network security method of claim 26,
wherein a Nessus like security server severity of said vulnerability is mapped into one of said outcome components as follows:
  Nessus like security server output level HIGH is mapped to Severe;
  Nessus like security server output level WARNING is mapped to Important; and
  Nessus like security server output level NOTE is mapped to Informational.

28. For a policy-based monitor method, a method for creating scanner network objects associated with at least one of:
  VA capability in said policy-based monitor system, wherein said network object is given an IP address of a network interface coupled to said policy-based monitor system used for scanning;
  a third-party network scanner, wherein said network object is given an IP address of said third-party scanner used for scanning; and
  automatically generating a set of scanning relationships for said network object in response to said network object selected as a scanning target, wherein said scanning relationships determine how traffic from an associated scanner to said network object is classified, wherein said scanning relationships are derived from an associated policy for said network object, and wherein said generating a set of scanning relationships further comprises the step of assigning at least one of two outcomes associated with said scanning relationship if a given service is offered in said network object's policy, said two outcomes comprising:
    if an initiator in a policy relationship includes a scanner itself, then said scanning relationship has a same outcome as that of said policy relationship; and
    if an initiator does not include a scanner, then an outcome Probed is assigned to said scanning relationship, wherein said outcome Probed has a criticality depicting a violation of said target network object's policy associated with all of its outcome components that denote a successful connection or two-way exchange of connectionless data.

29. For a policy-based monitor method, a method for network security for vulnerability assessment (VA) comprising the steps of:
  requesting vulnerability scans, processing returned results, and storing relevant data coupled to said request and results in a module;
  receiving said request for vulnerability scans, performing said vulnerability scans, and transmitting scan results to a VA client; and
  returning vulnerability scan results that are mapped into a vulnerability network event responsive to, and dependent on, an associated vulnerability state;
  said pdx compiler defining a subset of specific IP addresses to be removed from said complete set of IP addresses, whereby said subset of specific IP addresses will not be scanned.

30. The network security method of claim 29, further comprising the step of:
  in response to a policy file being compiled, a pdx compiler computing a set of IP addresses designated not to be scanned and outputting said set of IP addresses designated not to be scanned to a file as input for said VA client.

31. For a policy-based monitor method, a method for creating scanner network objects associated with at least one of:
  VA capability in said policy-based monitor system, wherein said network object is given an IP address of a network interface coupled to said policy-based monitor system used for scanning; and
  a third-party network scanner, wherein said network object is given an IP address of said third-party scanner used for scanning;
  said enterprise-level user interface accessing a policy description document generated as part of a policy update process, wherein said policy description document comprises a network object page, comprising a link to vulnerability information pertaining to said network object, wherein said policy description document provides a view of vulnerability information for an entire policy domain, and wherein a policy description document accessed through said policy-based monitor system provides visibility only to the hosts scanned by said VA Server.

32. For a policy-based monitor method, a method for creating scanner network objects associated with at least one of:
  VA capability in said policy-based monitor system, wherein said network object is given an IP address of a network interface coupled to said policy-based monitor system used for scanning;

a third-party network scanner, wherein said network object is given an IP address of said third-party scanner used for scanning; and automatically merging a host policy and a scanner policy; wherein said merged policy comprises at least one of:
 outcomes per host policy, wherein host policy applies to scanner as client host; and
 probed outcomes, wherein host policy does not apply to scanner as client host.

33. For a policy-based monitor method, a method for network security for vulnerability assessment (VA) comprising the steps of:

requesting vulnerability scans, processing returned results, and storing relevant data coupled to said request and results in a module;

receiving said request for vulnerability scans, performing said vulnerability scans, and transmitting scan results to a VA client;

returning vulnerability scan results that are mapped into a vulnerability network event responsive to, and dependent on, an associated vulnerability state;

determining vulnerability state information of a network using a continuous scanning technique;

determining when new vulnerability data is received at state new and emitting a monitored event, wherein if such vulnerability data are seen again, then assigning a state to persistent, and if said data are not seen again, then assigning a state to almost resolved;

determining if a machine on which vulnerability is detected is no longer visible on said network and assigning state inaccessible and emitting a monitored event;

from a persistent state, determining if vulnerability is detected again and keeping state at persistent;

from an almost resolved state, determining if vulnerability is seen again and changing state to persistent, and if said vulnerability is not seen after a predetermined amount of time, assigning state to resolved and emitting a monitored event;

determining if vulnerability is from a machine which ceases to be visible on said network and assigning state to inaccessible; and from an inaccessible state, determining if a machine returns from being invisible from an almost resolved state and returning state to said almost resolved state, and determining if a machine returns from being invisible from a persistent state and returning said state to persistent.

* * * * *